(12) United States Patent
Kanatani (10) Patent No.: US 12,395,928 B2
(45) Date of Patent: Aug. 19, 2025

(54) COMMUNICATION DEVICE, NON-TRANSITORY COMPUTER READABLE MEDIUM, AND COMMUNICATION METHOD

(71) Applicant: Oki Electric Industry Co., Ltd., Tokyo (JP)

(72) Inventor: Masaaki Kanatani, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 398 days.

(21) Appl. No.: 18/011,900

(22) PCT Filed: Apr. 1, 2021

(86) PCT No.: PCT/JP2021/014199
§ 371 (c)(1),
(2) Date: Dec. 21, 2022

(87) PCT Pub. No.: WO2021/261046
PCT Pub. Date: Dec. 30, 2021

(65) Prior Publication Data
US 2023/0247547 A1 Aug. 3, 2023

(30) Foreign Application Priority Data

Jun. 25, 2020 (JP) ................................. 2020-109939

(51) Int. Cl.
*H04W 52/02* (2009.01)
(52) U.S. Cl.
CPC ............................. *H04W 52/0203* (2013.01)

(58) Field of Classification Search
CPC ............. H04W 52/0203; H04W 52/02; H04W 52/0216; H04W 52/0229; G08C 15/00; G08C 17/02; H04L 12/46; H04Q 9/00
See application file for complete search history.

(56) References Cited

U.S. PATENT DOCUMENTS

| | | | |
|---|---|---|---|
| 2007/0220198 A1* | 9/2007 | Kassai | G06F 1/3221 713/320 |
| 2008/0055069 A1 | 3/2008 | Aiki et al. | |
| 2008/0309481 A1 | 12/2008 | Tanaka et al. | |

(Continued)

FOREIGN PATENT DOCUMENTS

| | | |
|---|---|---|
| JP | 2008-052414 A | 3/2008 |
| JP | 2008-059058 A | 3/2008 |

(Continued)

*Primary Examiner* — Kibrom T Hailu
(74) *Attorney, Agent, or Firm* — Rabin & Berdo, P.C.

(57) ABSTRACT

The present invention, a communication device configured to receive supply of electrical power from a battery unit and transmit and receive a data signal, the device includes a first wireless communication means configured to intermittently receive a data signal, a second wireless communication means configured to transmit a data signal; and a communication control means configured to temporarily hold the data signal received by the first wireless communication means, power off the second wireless communication means until a predetermined condition is satisfied, power on the second wireless communication means after a predetermined condition is satisfied, and transmit the held data signal.

7 Claims, 9 Drawing Sheets

(56) References Cited

U.S. PATENT DOCUMENTS

| | | | | |
|---|---|---|---|---|
| 2017/0366423 A1* | 12/2017 | Griot | ............... | H04L 67/568 |
| 2019/0011283 A1* | 1/2019 | Soutar | ............... | H02J 7/0063 |
| 2020/0396580 A1* | 12/2020 | Gilson | ............... | H04W 4/80 |
| 2021/0247426 A1* | 8/2021 | Liu | ............... | G06Q 30/0645 |

FOREIGN PATENT DOCUMENTS

| | | |
|---|---|---|
| JP | 2008-310630 A | 12/2008 |
| JP | 2016-122310 A | 7/2016 |

\* cited by examiner

COMMUNICATION DEVICE, NON-TRANSITORY COMPUTER READABLE MEDIUM, AND COMMUNICATION METHOD

TECHNICAL FIELD

The present invention relates to a communication device, a non-transitory computer readable medium, and a communication method.

BACKGROUND ART

Figure 1:
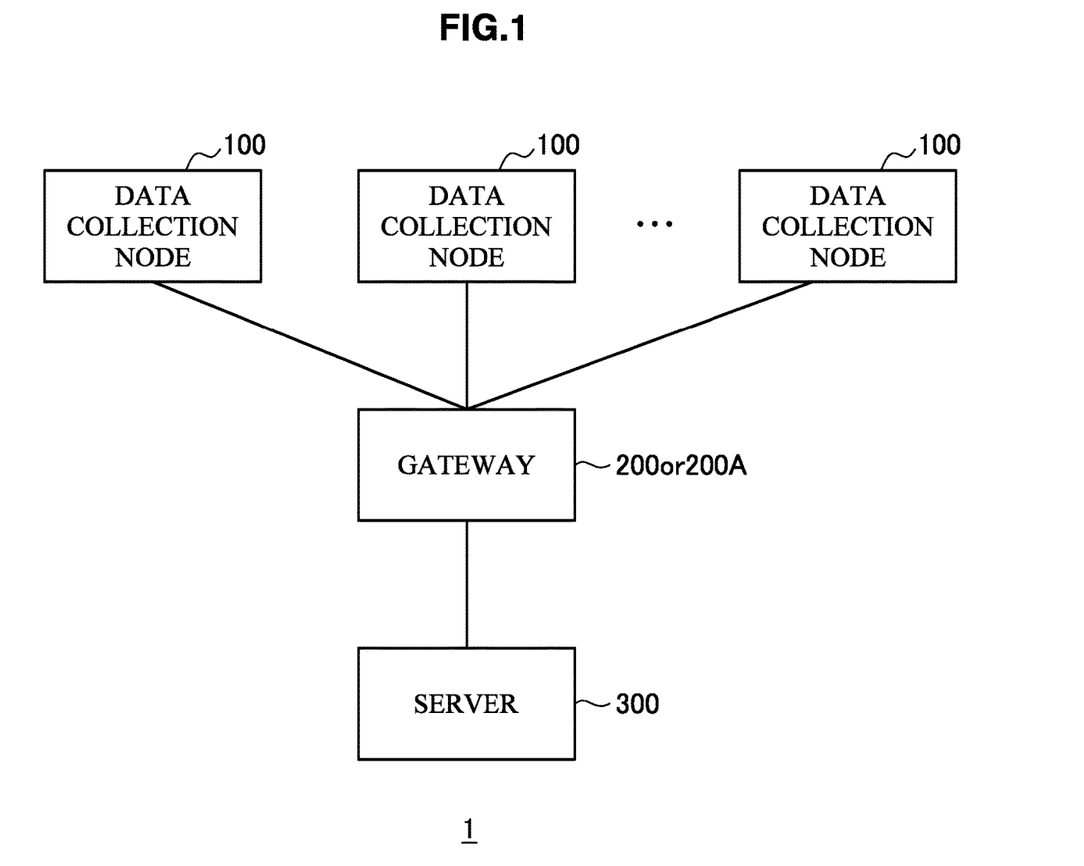
FIG. 1 is an overall configuration diagram illustrating an overall configuration of a data collection system (communication system) according to a first embodiment.

An example of a system that collects a small amount of data such as sensor data is a data collection system illustrated in FIG. 1 (see Patent Literature 1). Such a data collection system may consist of one or a plurality of data collection nodes 100 that collect data in contact with or in the vicinity of a data collection target, a server 300, and a gateway 200 that notifies the server 300 of data received from each of the data collection nodes 100.

In addition, in such a data collection system, connection and data transmission and reception may be performed through wireless communication between the data collection node 100 and the gateway 200 and between the gateway 200 and the server 300. In this case, the data collection node 100 may use a power-saving wireless communication technique for communication between the data collection node 100 and the gateway 200 because it is generally driven by batteries in many cases, and the gateway 200 may use a mobile communication network such as, for example, a third-generation mobile communication system (3G) or a fourth-generation mobile communication system (such as 4G: Long Term Evolution (LTE)) for communication between the gateway 200 and the server 300 in order to deliver data to the remote server 300.

In the past, the gateway 200 would generally have been assumed to be connected to a constant-supply power source such as a commercial power source.

CITATION LIST

Patent Literature

Patent Literature 1: JP 2016-122310A

SUMMARY OF INVENTION

Technical Problem

However, it may be difficult to supply commercial power to the gateway in a case where the gateway is installed outdoors, for example, as is the case with the data collection node. In that case, a battery unit combining a solar cell, a rechargeable battery, or the like may be mounted on the gateway to secure electrical power to be supplied. Since the power consumption of the gateway is relatively large, an attempt to mount a battery unit that satisfies this requirement leads to an increase in the size and mass of the battery unit. On the other hand, mounting a small-sized battery unit may also cause a limitation on the amount of output power and a decrease in the operation time of the gateway.

Therefore, there is a demand for a communication device, a non-transitory computer readable medium, and a communication method that make it possible to control supply of electrical power to a communication unit to achieve power saving.

Solution to Problem

To solve this problem, a first aspect of the present invention, a communication device configured to receive supply of electrical power from a battery unit and transmit and receive a data signal, the device is characterized by including (1) a first wireless communication means configured to intermittently receive a data signal, (2) a second wireless communication means configured to transmit a data signal; and (3) a communication control means configured to temporarily hold the data signal received by the first wireless communication means, power off the second wireless communication means until a predetermined condition is satisfied, power on the second wireless communication means after a predetermined condition is satisfied, and transmit the held data signal.

A second aspect of the present invention, a non-transitory computer readable medium having a communication program stored therein for a communication device configured to receive supply of electrical power from a battery unit and transmit and receive a data signal, the program is characterized by causing a computer to function as a first wireless communication means configured to intermittently receive a data signal, a second wireless communication means configured to transmit a data signal and a communication control means configured to temporarily hold the data signal received by the first wireless communication means, power off the second wireless communication means until a predetermined condition is satisfied, power on the second wireless communication means after a predetermined condition is satisfied, and transmit the held data signal.

A third aspect of the present invention, a communication method of receiving supply of electrical power from a battery unit and transmitting and receiving a data signal, the method is characterized by including causing a first wireless communication means to intermittently receive a data signal, a second wireless communication means to transmit a data signal under power control, a communication control means to temporarily hold the data signal received by the first wireless communication means, power off the second wireless communication means until a predetermined condition is satisfied, power on the second wireless communication means after a predetermined condition is satisfied, and transmit the held data signal.

Advantageous Effects of Invention

According to the present invention, it is possible to control supply of electrical power to a communication unit to achieve power saving.

DESCRIPTION OF EMBODIMENTS

(A) First Embodiment

Hereinafter, a first embodiment of a communication device, a non-transitory computer readable medium, and a communication method according to the present invention will be described in detail with reference to the accompanying drawings.

(A-1) Configuration of First Embodiment

FIG. 1 is an overall configuration diagram illustrating an overall configuration of a data collection system (communication system) according to a first embodiment.

In FIG. 1, a data collection system 1 according to the first embodiment includes a plurality of data collection nodes 100, a gateway 200, and a server 300.

[Data Collection Node]

The data collection nodes 100 are wirelessly connected to the gateway 200 and intermittently or periodically transmit communication signals with the server 300 as a final destination of collected data to the gateway 200. The allocation of a data transmission timing is not particularly limited, and each of the data collection nodes 100 may intermittently or periodically transmit data, for example, at a timing specified by the data collection system 1.

Meanwhile, the data collection node 100 may be, for example, a sensor device that has a sensor and transmits sensor data measured by the sensor, or, for example, a device that receives sensor data from one or a plurality of other sensor devices and transmits it to the server 300. In any case, the data collection node 100 transmits a small amount of data to the server 300 through the gateway 200.

[Gateway]

The gateway 200 transmits and receives a communication signal including data between the data collection node 100 and the server 300. For example, in a case where the gateway 200 receives a communication signal including data from the data collection node 100, the gateway 200 transmits the communication signal including data from the data collection node 100 to the server 300 serving as a higher-level device.

The hardware configuration of the gateway 200 can have a device having a CPU, a ROM, a RAM, an EEPROM, a communication device, and the like applied thereto as in an existing gateway, and can be realized by the CPU executing a process program (such as, for example, a communication program).

Figure 2:
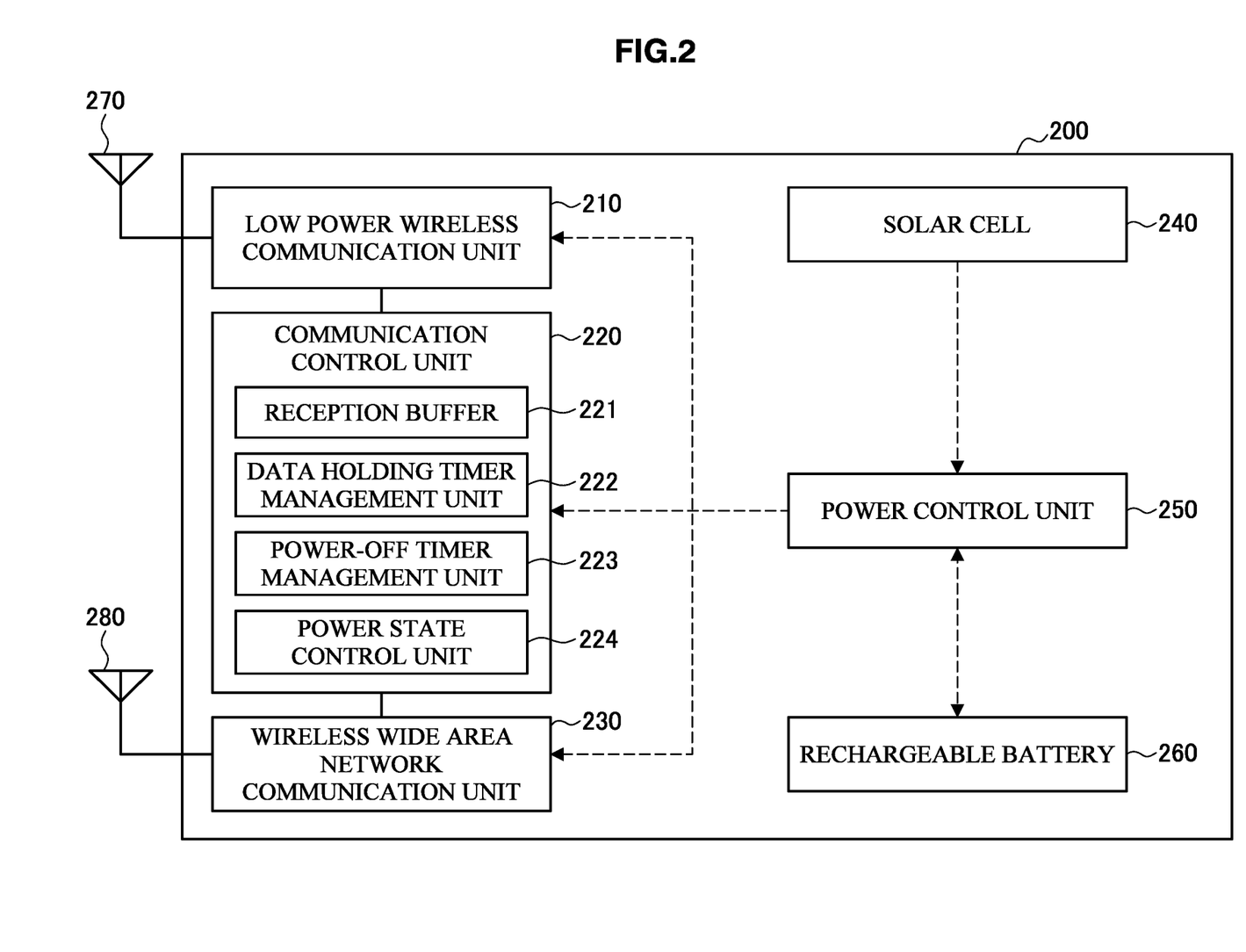
FIG. 2 is an internal configuration diagram illustrating an internal configuration of a gateway according to the first embodiment.

FIG. 2 is an internal configuration diagram illustrating an internal configuration of the gateway 200 according to the first embodiment.

In FIG. 2, the gateway 200 includes a low power wireless communication unit 210, a communication control unit 220, a wireless wide area network communication unit 230, a solar cell 240, a power control unit 250, and a rechargeable battery 260. In FIG. 2, broken lines indicate supply of electrical power.

The gateway 200 operates by receiving supply of electrical power from the solar cell 240 or the rechargeable battery 260, and can also be installed in a place where it is difficult to supply electrical power from a commercial power source.

In addition, the gateway 200 is provided with a plurality of wireless communication means, and this embodiment illustrates a case in which the gateway is provided with a first wireless communication means for wirelessly communicating with the data collection node 100 and a second wireless communication means for wirelessly communicating with the server 300. The low power wireless communication unit 210 is shown as an example of the first wireless communication means, and the wireless wide area network communication unit 230 is shown as an example of the second wireless communication means. Meanwhile, three or more types of wireless communication means may be provided, and may each use the same wireless communication scheme or may each use different wireless communication schemes.

[Solar Cell, Rechargeable Battery, and Power Control Unit]

The power control unit 250 performs control for charging the rechargeable battery 260 with electrical power which is output from the solar cell 240 and power control for supplying electrical power stored in the rechargeable battery to each communication unit (the low power wireless communication unit 210 or the wireless wide area network communication unit 230) and the communication control unit 220.

Meanwhile, here, a battery such as the solar cell 240 or the rechargeable battery 260 which is mounted in the gateway 200 to contribute to driving electrical power to each component of the gateway 200 is referred to as a "battery unit." Further, the solar cell 240, the rechargeable battery 260, and the power control unit 250 are also referred to as a "battery unit."

[Low Power Wireless Communication Unit]

The low power wireless communication unit 210 performs wireless transmission to the data collection node 100 or wireless reception from the data collection node 100 through an antenna unit 270. The low power wireless communication unit 210 is supplied with electrical power under the control of the power control unit 250 to perform wireless communication.

The low power wireless communication unit 210 can apply a wireless communication scheme represented by a specified low-power wireless communication scheme or the like, and may apply a wireless communication scheme such as a wireless network standard represented by, for example, IEEE802.11a/b/g/n or the like, IEEE802.15.4, or Bluetooth (registered trademark). Each of the low power wireless communication unit 210 and the data collection node 100 is allocated a unique address (such as, for example, a MAC address, a short address, or an IP address) on a network, thereby allowing transmission and reception of data to be realized.

[Wireless Wide Area Network Communication Unit]

The wireless wide area network communication unit 230 performs wireless transmission to the server 300 or wireless reception from the server 300 through an antenna unit 280. The wireless wide area network communication unit 230 is supplied with electrical power under the control of the power control unit 250 to perform wireless communication.

The wireless wide area network communication unit 230 performs wireless wide area network communication with the server 300. A wireless communication technique can be widely applied without being particularly limited, and, for example, a 3G standardized technique, a 4G (LTE) standardized technique, or the like can be applied. Each of the wireless wide area network communication unit 230 and the server 300 is allocated a unique address (such as, for example, a MAC address, a short address, or an IP address) on a network, thereby allowing transmission and reception of data to be realized.

[Communication Control Unit]

The communication control unit 220 controls communication of the low power wireless communication unit 210 and the wireless wide area network communication unit 230, accepts data received from the data collection node 100 from the low power wireless communication unit 210, gives the data to the wireless wide area network communication unit 230, and causes the wireless wide area network communication unit 230 to transmit a communication signal including data.

In FIG. 2, the communication control unit 220 includes a reception buffer 221, a data holding timer management unit 222, a power-off timer management unit 223, and a power state control unit 224.

The reception buffer 221 is a data holding unit that temporarily holds one or a plurality of pieces of data from the data collection node 100 accepted from the low power wireless communication unit 210. Each piece of data received intermittently or periodically from each of the data collection nodes 100 is temporarily held in the reception buffer 221.

When data is held in the reception buffer 221, the data holding timer management unit 222 starts to operate the data holding timer for a predetermined timer period, and monitors whether the data holding timer times out (that is, whether the data holding timer has reached a predetermined timer period). The data holding timer starts clocking at a timing when data is held in the reception buffer 221 in a state where data is not held.

In order to power off the wireless wide area network communication unit 230 (cut off supply of electrical power) after the wireless wide area network communication unit 230 starts a data transmission process and completes transmission of one or a plurality of pieces of held data, the power-off timer management unit 223 clocks a power-off timer for a predetermined timer period and monitors whether the power-off timer times out (that is, whether the power-off timer has reached a predetermined timer period).

The power state control unit 224 controls the state of electrical power which is supplied to the wireless wide area network communication unit 230 by the power control unit 250 and controls the data transmission process of the wireless wide area network communication unit 230.

Although a detailed description of a control method of the power state control unit 224 will be given in the section on operation, the power state control unit 224 monitors the power state of the wireless wide area network communication unit 230, and causes a predetermined data holding timer to time out instead of powering on the wireless wide area network communication unit 230 at all times, or powers on the wireless wide area network communication unit 230 to start the data transmission process when the value of the number of pieces of held data is equal to or greater than a threshold.

Further, the power state control unit 224 powers off the wireless wide area network communication unit 230 when the transmission of the held data is completed and then the power-off timer for powering off the wireless wide area network communication unit 230 times out. That is, after the transmission of the held data, the wireless wide area network communication unit 230 is powered off to stop the data transmission process. In this way, the communication control unit 220 controls the power state of the wireless wide area network communication unit 230, thereby allowing power saving to be achieved.

[Server]

The server 300 is a server that is able to communicate with the gateway 200 and receives a communication signal including data from the gateway 200. The server 300 can widely use a server of an existing technique and performs predetermined various processes using collected data, but in this embodiment, various functions of the server 300 will not be described.

(A-2) Operation of First Embodiment

Next, processing operations in the gateway 200 according to the first embodiment will be described in detail with reference to the accompanying drawings.

Figure 3:
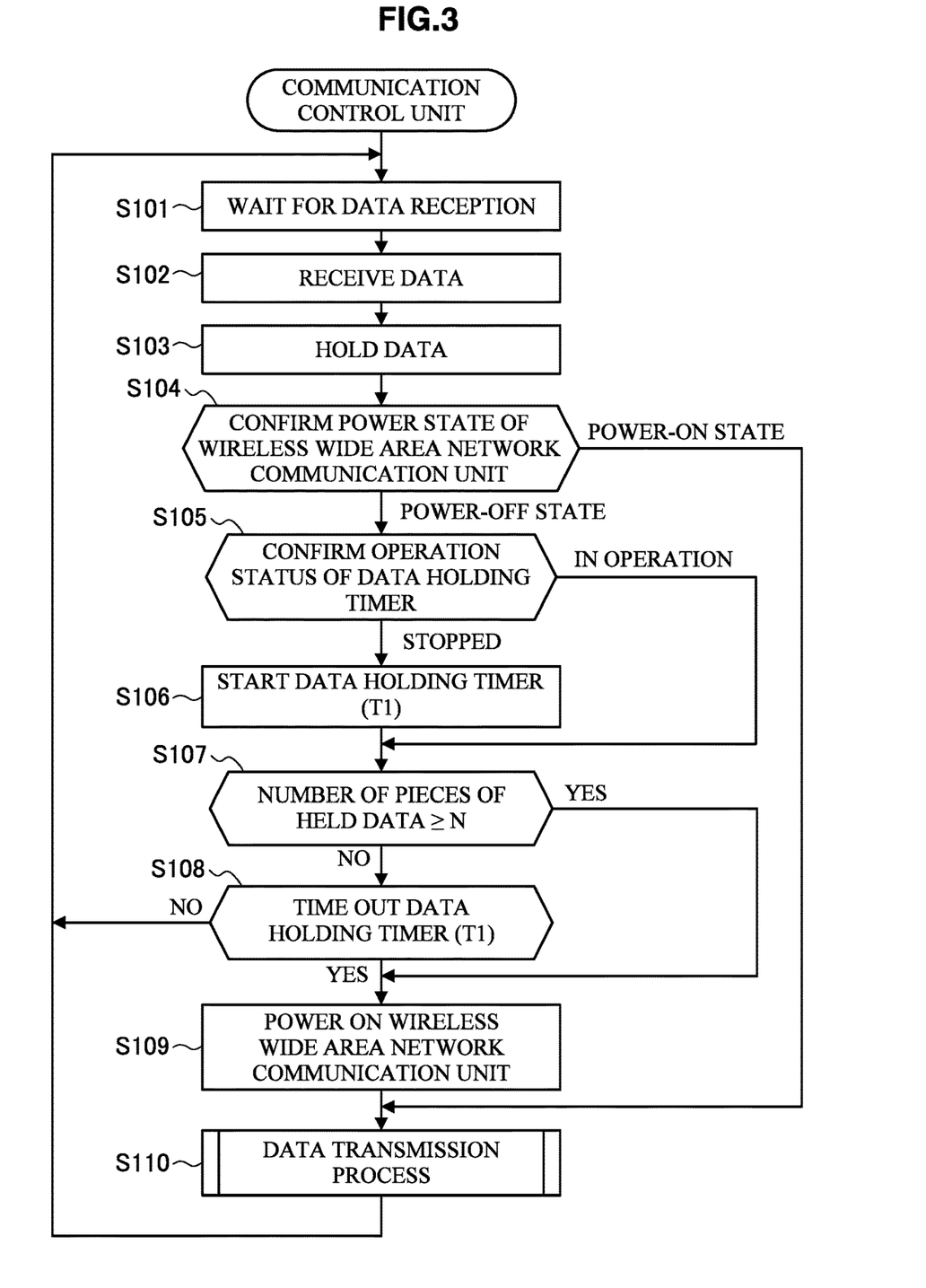
FIG. 3 is a flowchart illustrating processing in a communication control unit according to the first embodiment.

FIG. 3 is a flowchart illustrating processing in the communication control unit 220 according to the first embodiment.

In the gateway 200, the communication control unit 220 is in a state of waiting for data reception from the data collection node 100 through the low power wireless communication unit 210 (S101). When data from each of the data collection nodes 100 is received by the low power wireless communication unit 210 (S102), each piece of received data is temporarily held in the reception buffer 221 (S103).

Next, in the communication control unit 220, the power state control unit 224 confirms the power state of the wireless wide area network communication unit 230 (S104). Here, the wireless wide area network communication unit 230 consumes a large amount of power, and thus is assumed to be powered off in a state where communication is not occurring. However, in a case where data is received from the low power wireless communication unit 210 while the wireless wide area network communication unit 230 is transmitting data, the wireless wide area network communication unit 230 may be in a power-on state. Consequently, the power state control unit 224 confirms the power state of the wireless wide area network communication unit 230 when each piece of data is received.

In a case where the wireless wide area network communication unit 230 is in a power-on state (S104/power-on state), the process proceeds to S110 and the data transmission process is performed (S110). That is, since the wireless wide area network communication unit 230 in a power-on state is communicating, the wireless wide area network communication unit 230 transmits the data received this time, and the communication control unit 220 controls the power state of the wireless wide area network communication unit 230. Meanwhile, a method of controlling the power state of the wireless wide area network communication unit 230 which is performed by the communication control unit 220 during the data transmission process will be described later.

On the other hand, in a case where the wireless wide area network communication unit 230 is in a power-off state (S104/power-off state), the process proceeds to S105, and the data holding timer management unit 222 confirms the operation status of the data holding timer (S105).

In a case where the data holding timer is in operation (S105/in operation), the process proceeds to S107. Here, the state in which the data holding timer is in operation means when another data is held in the reception buffer 221 from the data collection node 100 within a timer period (T1) until timeout after the data holding timer starts to operate. That is, the data holding timer operates when another data received intermittently is held in the reception buffer 221 after the data holding timer starts to operate.

On the other hand, in a case where the data holding timer is stopped (S105/stopped), the data holding timer management unit 222 starts to clock the data holding timer for a predetermined timer period (here referred to as a "timer period T1") (S106).

The power state control unit 224 confirms the number of pieces of data held in the reception buffer 221, and compares the number of pieces of held data with a threshold (here, the value of a threshold is N) (S107). The value of a threshold N for evaluating the number of pieces of data held in the reception buffer 221 is assumed to be set in advance.

When the number of pieces of held data is equal to or greater than the threshold N (S107/YES), the power state control unit 224 instructs the power control unit 250 to supply electrical power to the wireless wide area network communication unit 230, electrical power is supplied to the wireless wide area network communication unit 230 under the control of the power control unit 250, and the wireless wide area network communication unit 230 is powered on (S109).

On the other hand, when the number of pieces of held data is less than the threshold N (S107/NO), it is confirmed whether the data holding timer has reached the timer period T1 and timed out (S108). When the data holding timer times out (S108/YES), the power state control unit 224 instructs the power control unit 250 to supply electrical power to the wireless wide area network communication unit 230, electrical power is supplied to the wireless wide area network communication unit 230 under the control of the power control unit 250, and the wireless wide area network communication unit 230 is powered on (S109).

That is, in the processes of S107 to S109, when the number of pieces of data held in the reception buffer 221 is equal to or greater than the threshold N, or when the data holding timer times out, the power control unit 250 supplies electrical power to the wireless wide area network communication unit 230 to power on the communication unit.

Meanwhile, when the number of pieces of data held in the reception buffer 221 is less than the threshold N and the data holding timer has not timed out (S108/NO), the process returns to S101, and the process is performed repeatedly.

As described above, in a case where the wireless wide area network communication unit 230 is supplied with electrical power and is powered on when the number of pieces of data held in the reception buffer 221 is equal to or greater than the threshold N, or when the data holding timer times out, the wireless wide area network communication unit 230 starts the process of transmitting the data held in the reception buffer 221 to the server 300.

Figure 4:
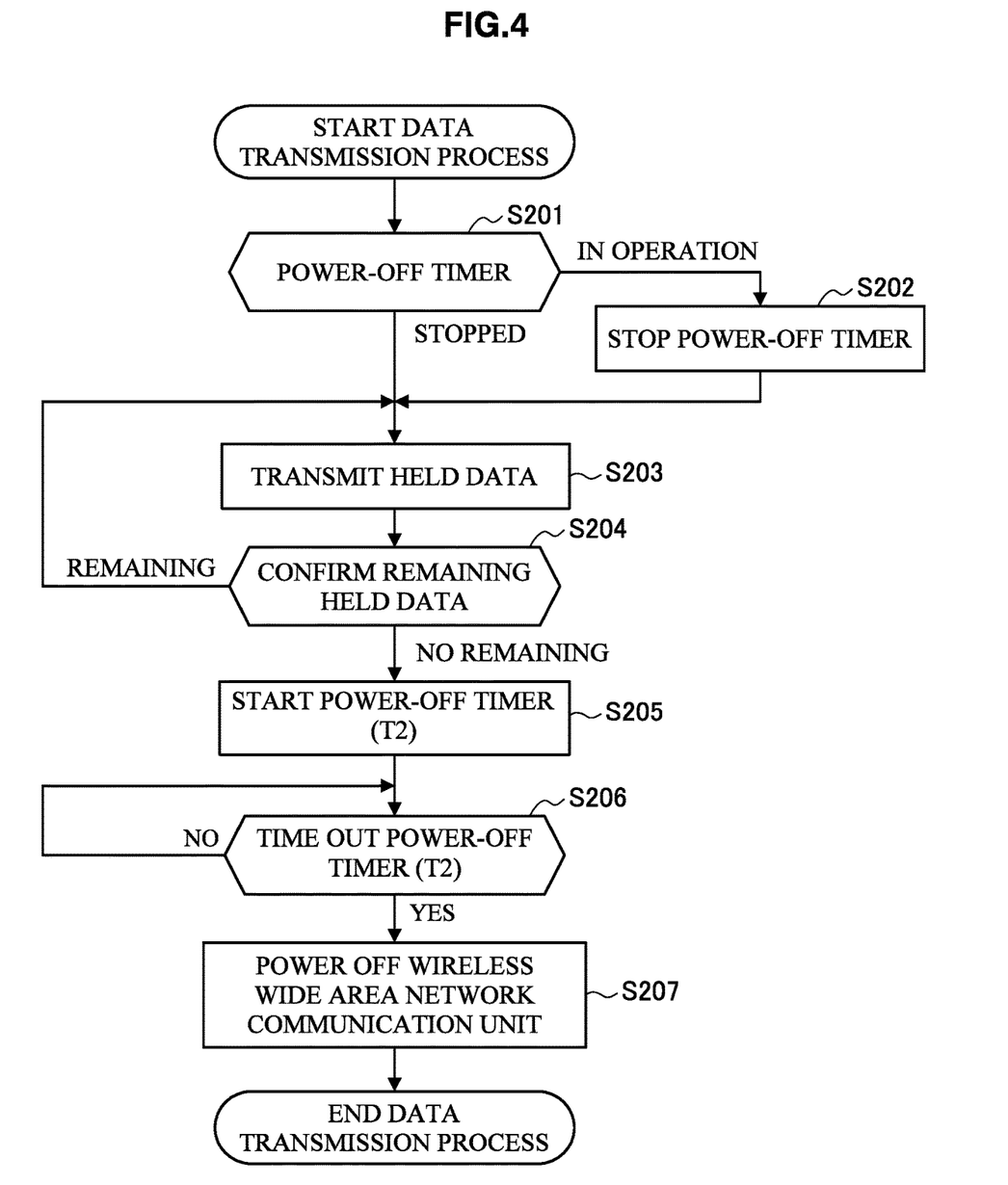
FIG. 4 is a flowchart illustrating processing of the communication control unit during a data transmission process in the first embodiment.

In this case, when the wireless wide area network communication unit 230 starts the data transmission process, the communication control unit 220 performs processing during the data transmission process illustrated in FIG. 4 in order to power off the wireless wide area network communication unit 230 (S110). The data transmission process and reception process are performed in parallel, and a data reception waiting state is entered after the data transmission process is started (S101).

FIG. 4 is a flowchart illustrating processing of the communication control unit 220 during the data transmission process in the first embodiment.

When the wireless wide area network communication unit 230 starts the data transmission process, the power-off timer management unit 223 confirms the operation status of the power-off timer (S201).

In a case where the power-off timer is stopped (S201/stopped), the data held in the reception buffer 221 is sequentially given to the wireless wide area network communication unit 230, and the wireless wide area network communication unit 230 transmits the data to the server 300 (S203). On the other hand, in a case where the power-off timer is in operation (S201/in operation), the power-off timer is stopped (reset) (S202), and the process proceeds to S203.

In the communication control unit 220, the power state control unit 224 confirms the remaining data held in the reception buffer 221 (S204), and data transmission is repeatedly performed until the held data runs out (S204/remaining).

When the data held in the reception buffer 221 runs out (S204/no remaining), the power-off timer management unit 223 starts to clock the power-off timer for a predetermined timer period (here referred to as a "timer period T2") (S205). In other words, the power-off timer starts to operate at a timing when all pieces of data held in the reception buffer 221 are transmitted.

Until the power-off timer reaches the timer period T2, the end of the data transmission process is waited for (S206/NO). In this state, when the data transmission process is started again, the transmission process is performed until the held data runs out, and when the data runs out, a data transmission process end waiting state is entered.

On the other hand, when the power-off timer times out (S206/YES), the power state control unit 224 instructs the power control unit 250 to cut off supply of electrical power to the wireless wide area network communication unit 230, the supply of electrical power to the wireless wide area network communication unit 230 is cut off under the control of the power control unit 250, the wireless wide area network communication unit 230 is powered off (S207), and the data transmission process ends.

Meanwhile, the flows of the data reception process in FIG. 3 and the data transmission process in FIG. 4 are an example, and are not limited to the processing of FIGS. 3 and 4. For example, S108 in FIG. 3 and S205-S206 in FIG. 4 show that the data holding timer and the power-off timer each time out, but the operations of the timers may be managed in parallel. That is, insofar as the data holding timer can measure the power-on time of the wireless wide area network communication unit 230 and the power-off timer can measure the power-off time of the wireless wide area network communication unit 230, the timers may be processed in parallel.

Figure 5:
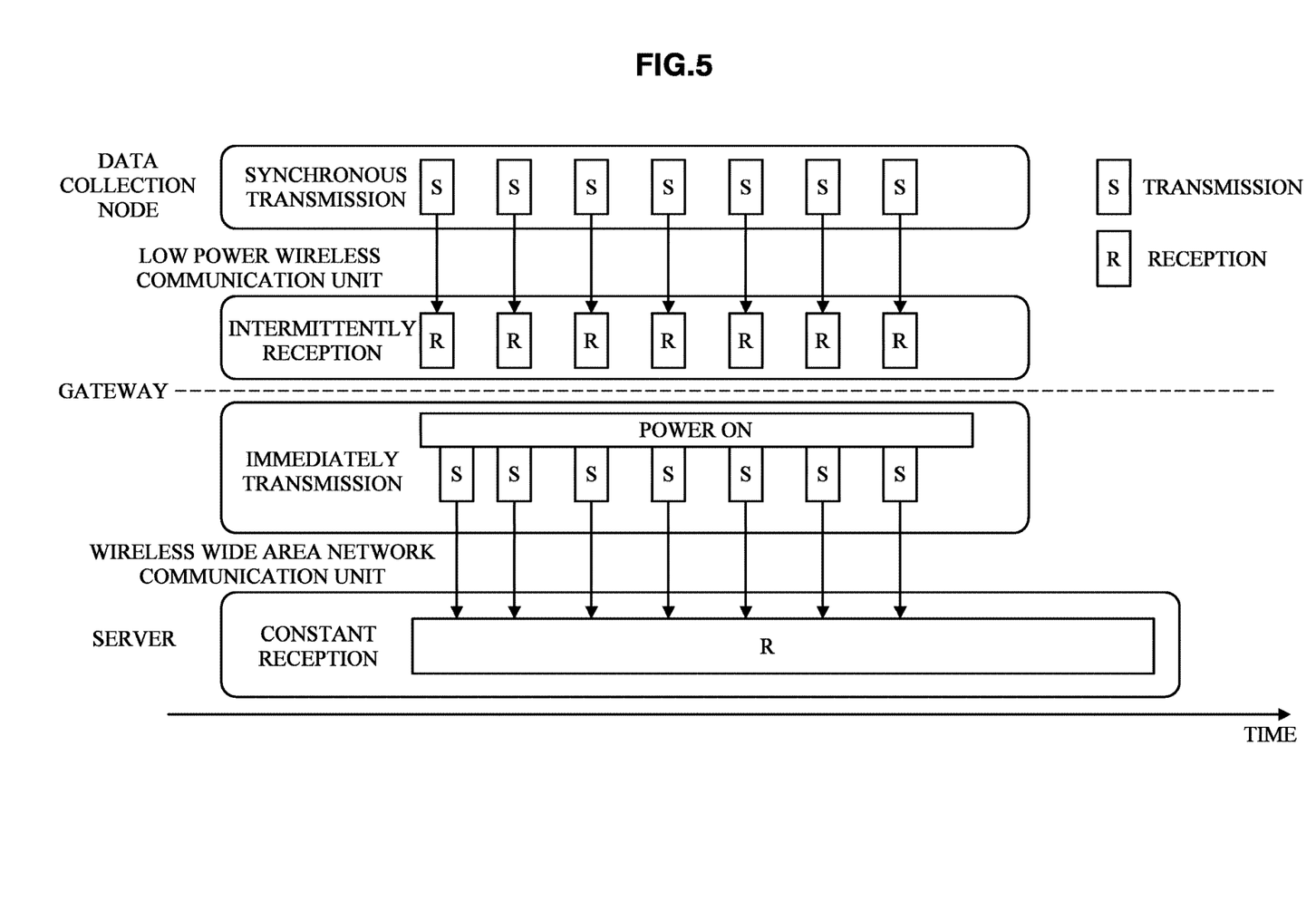
FIG. 5 is an explanatory diagram illustrating an operation of data communication in a conventional data collection system.
Figure 6:
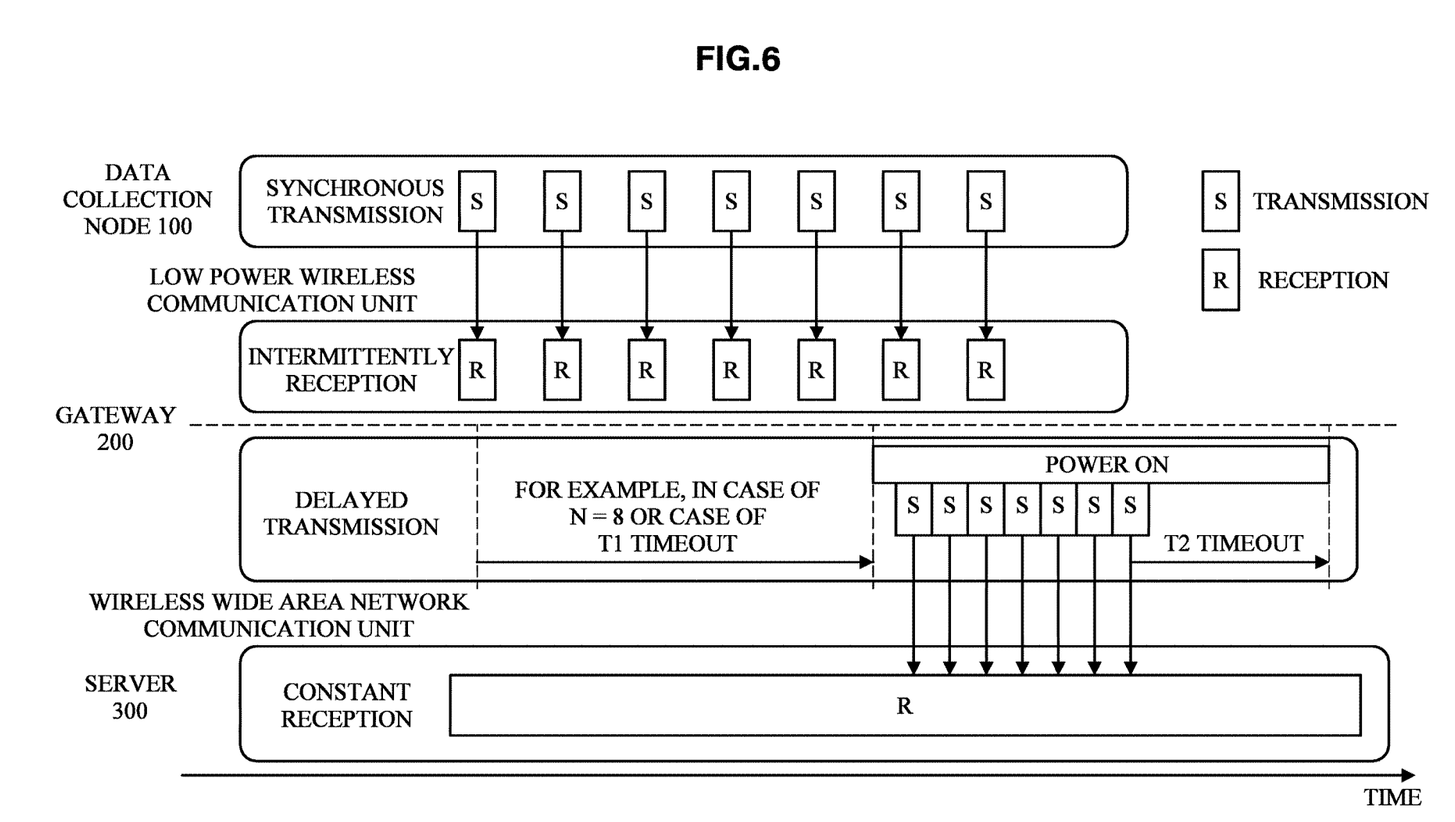
FIG. 6 is an explanatory diagram illustrating an operation of data communication to which the data collection system according to the first embodiment is applied.

FIG. 5 is an explanatory diagram illustrating an operation of data communication in a conventional data collection system, and FIG. 6 is an explanatory diagram illustrating an operation of data communication to which the data collection system according to the first embodiment is applied.

As illustrated in FIGS. 5 and 6, the data collection node 100 transmits data in accordance with the reception timing of the low power wireless communication unit 210 on the reception side, and in the gateway 200, the low power wireless communication unit 210 intermittently receives data from the data collection node 100. Even when continuous data is generated in the data collection node 100, the gateway 200 receives data at certain intervals.

Meanwhile, even when the data collection node 100 periodically collects and transmits a small amount of data (for example, the number of pieces of data is relatively small) at certain time intervals, the low power wireless communication unit 210 receives data at certain intervals regardless of whether intermittent reception illustrated in FIGS. 5 and 6 is performed.

For example, as illustrated in FIG. 5, when data is received from the data collection node 100, a conventional wireless wide area network communication unit immediately transmits the data to the server 300. When the power consumption of the wireless wide area network communication unit is large, and the wireless wide area network communication unit is supplied with electrical power and is powered on in order to transmit data to the server 300 during reception of the data from the data collection node 100, the wireless wide area network communication unit remains powered on until transmission of the data to the server 300 is completed, which results in an increase in power consumption.

In this case, powering off the wireless wide area network communication unit after the wireless wide area network communication unit transmits the data can also be considered, but the power consumption may rather increase depending on the timing of reception of the data from the data collection node 100.

Consequently, in the first embodiment, as illustrated in FIG. 6, instead of immediately transmitting the data received from the data collection node 100, the communication control unit 220 temporarily holds the received data, and during that time, powers off the wireless wide area network communication unit 230 without supplying electrical power thereto. When the number of pieces of held data is equal to or greater than a threshold or the data holding timer times out, the wireless wide area network communication unit 230 is supplied with electrical power and is powered on, and the wireless wide area network communication unit 230 starts to transmit the data to the server 300. At this time, in a case where there is held data, data transmission can be started sequentially and continuously without waiting for the next reception.

Further, when a predetermined period of time has elapsed after transmission of the held data, supply of electrical power to the wireless wide area network communication unit 230 is cut off to power off the communication unit, and thus it is possible to shorten a power-on period.

(A-3) Effect of First Embodiment

As described above, according to the first embodiment, the gateway (communication device) does not immediately transmit the received data but temporarily holds the data, powers off the wireless wide area network communication unit 230 until the number of pieces of held data is accumulated to a certain extent or a predetermined period of time elapses, and then supplies electrical power to the wireless wide area network communication unit 230 to power on the communication unit, thereby allowing the data to be sequentially transmitted. As a result, when the number of pieces of data is the same, it is possible to shorten the power-on time of the wireless wide area network communication unit 230, and to perform communication between the gateway 200 and the server 300 in a more power saving manner.

(B) Second Embodiment

Next, a second embodiment of a communication device, a non-transitory computer readable medium, and a communication method according to the present invention will be described in detail with reference to the accompanying drawings.

(B-1) Configuration of Second Embodiment

A data collection system (communication system) according to the second embodiment has the same configuration as the data collection system 1 shown in FIG. 1 of the first embodiment, and the second embodiment will also be described with reference to FIG. 1.

Figure 7:
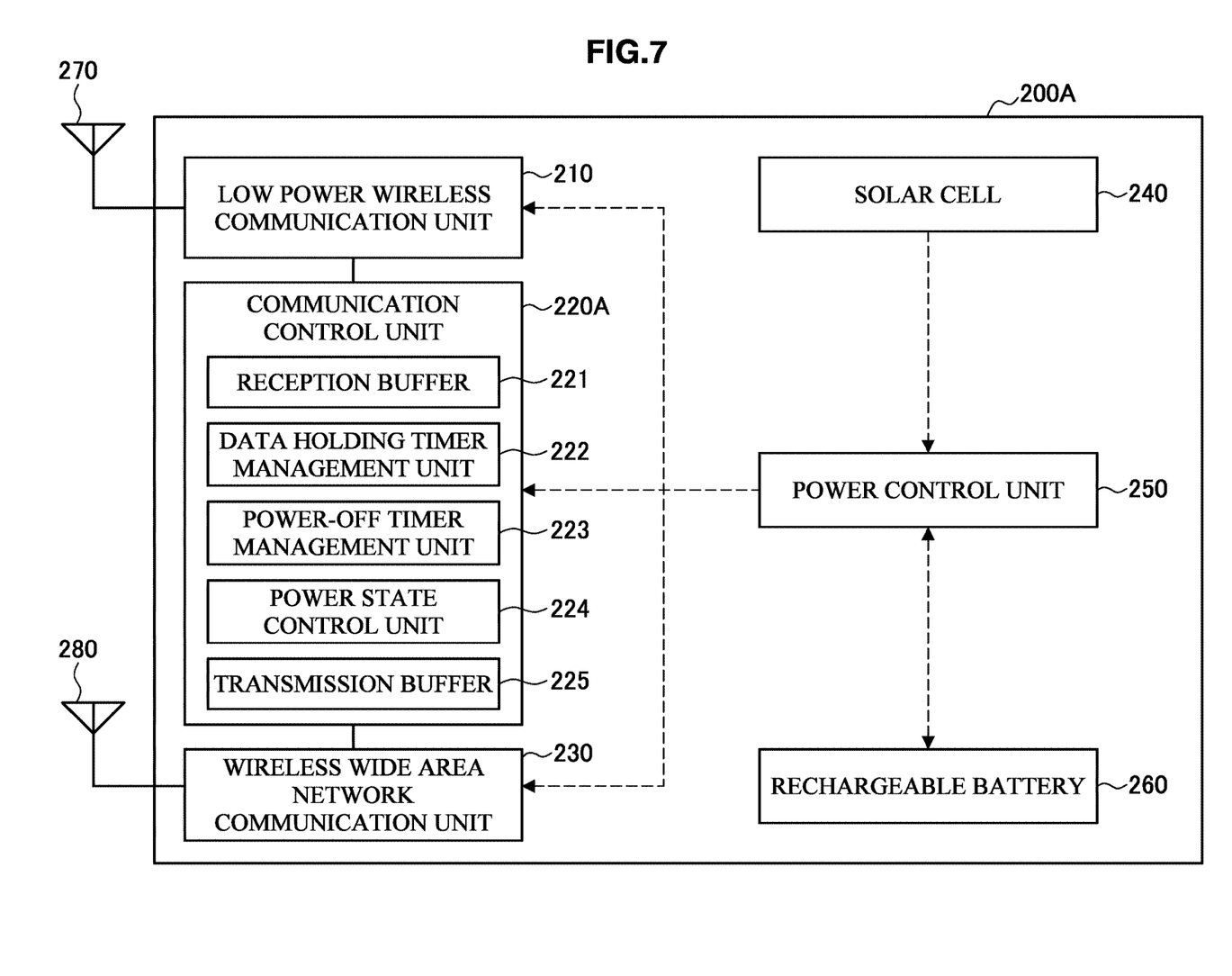
FIG. 7 is an internal configuration diagram illustrating an internal configuration of a gateway according to a second embodiment.

FIG. 7 is an internal configuration diagram illustrating an internal configuration of a gateway 200A according to the second embodiment.

In FIG. 7, the gateway 200A according to the second embodiment basically has the same configuration as the gateway 200 of the first embodiment, but a data transmission process which is performed by a communication control unit 220A is different from the data transmission process of the first embodiment, and thus a description will be given below with focus on a second data transmission process.

The communication control unit 220A includes the reception buffer 221, the data holding timer management unit 222, the power-off timer management unit 223, the power state control unit 224, and a transmission buffer 225.

During the data transmission process in addition to the processing described in the first embodiment, the power state control unit 224 extracts one piece of data from a string of data held in the reception buffer 221 and holds copied data in the transmission buffer 225. When data is added to the transmission buffer 225, the power state control unit 224 stores the number of transmission buffer storage data held in the transmission buffer 225. When the number of transmission buffer storage data held in the transmission buffer 225 is compared with a threshold set in advance and the number of transmission buffer storage data is equal to or greater than the threshold, the data held in the transmission buffer 225 is given to the wireless wide area network communication unit 230 for transmission.

The transmission buffer 225 is a transmission data holding unit that holds copied data extracted from a string of data held in the reception buffer 221.

The wireless wide area network communication unit 230 collectively transmits a plurality of pieces of data held in the transmission buffer 225 to the server 300.

(B-2) Operation of Second Embodiment

Next, processing operations in the gateway 200A according to the second embodiment will be described in detail with reference to the accompanying drawings.

Figure 8:
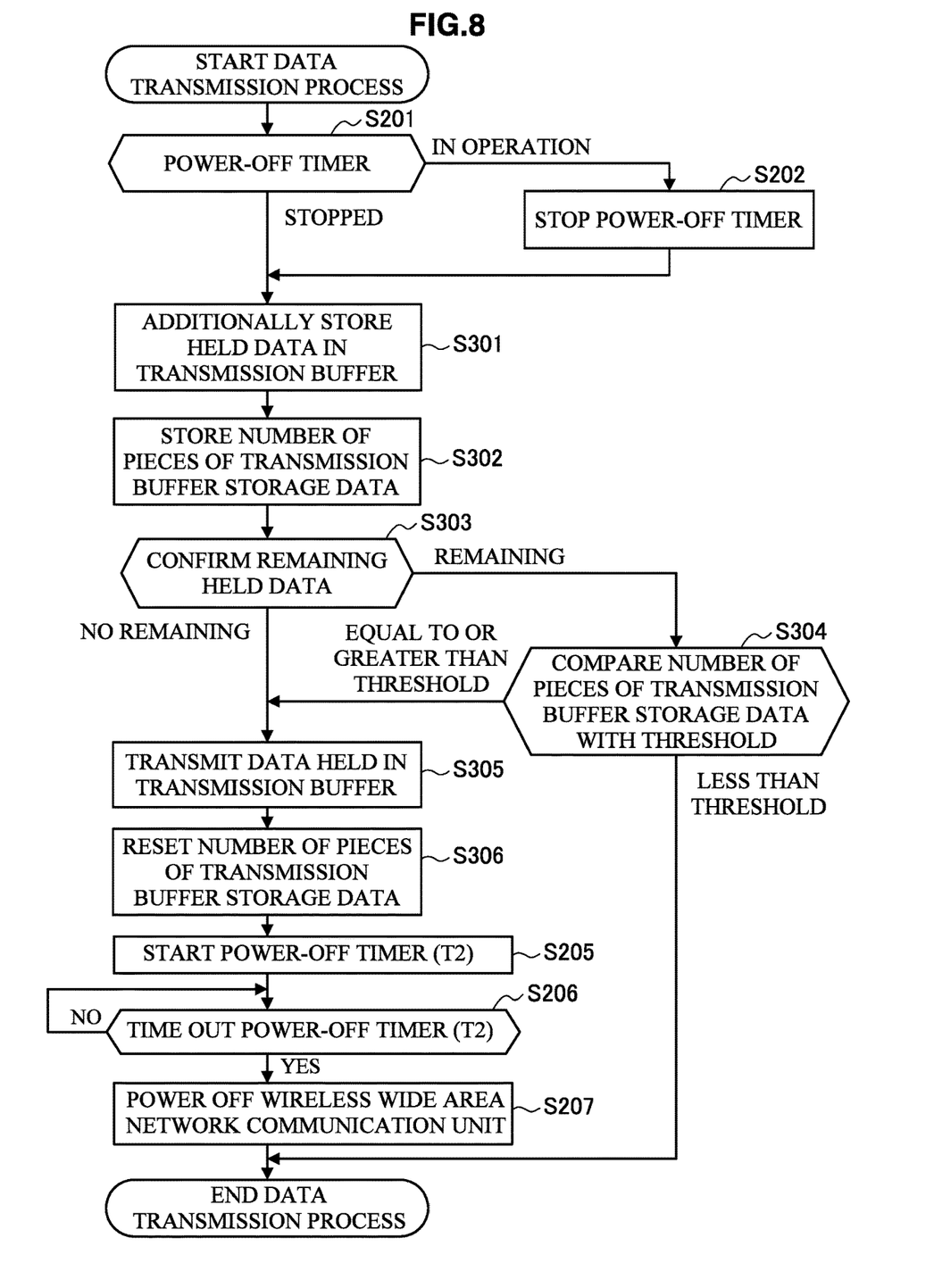
FIG. 8 is a flowchart illustrating processing of a communication control unit during a data transmission process in the second embodiment.

FIG. 8 is a flowchart illustrating processing of the communication control unit 220A during the data transmission process in the second embodiment.

The gateway 200A of the second embodiment performs the processing illustrated in FIG. 3 of the first embodiment, and performs the processing illustrated in FIG. 8 in the data transmission process of S110 in FIG. 3.

When the wireless wide area network communication unit 230 starts the data transmission process, the power-off timer management unit 223 confirms the operation status of the power-off timer (S201). In a case where the power-off timer is stopped (S201/stopped), the process proceeds to S301, and in a case where the power-off timer is in operation (S201/in operation), the power-off timer is stopped (reset) (S202), and the process proceeds to S301.

Similarly, in the second embodiment, when data is received from the data collection node 100, it is not immediately transmitted, one piece of data is extracted from a string of data held in the reception buffer 221, and the data is copied and additionally stored in the transmission buffer 225 (S301). In this case, the power state control unit 224 stores the number of transmission buffer storage data (S302).

Next, the power state control unit 224 confirms whether the held data remains in the reception buffer 221 (S303), and in a case where there is no held data in the reception buffer 221, the process proceeds to S305. In addition, when the held data remains in the reception buffer 221 (S303/remaining), the process proceeds to S304.

In S304, the number of transmission buffer storage data held in the transmission buffer 225 is compared with a threshold (S304), and in a case where the number of transmission buffer storage data is less than the threshold (S304/less than the threshold), the data transmission process ends. On the other hand, in a case where the number of transmission buffer storage data is equal to or greater than the threshold (S304/equal to or greater than the threshold), the process proceeds to S305.

Here, the threshold for determining the number of transmission buffer storage data is a value related to the minimum value of the number of pieces of data to be collectively transmitted to the wireless wide area network communication unit 230. This threshold value can be set in accordance with the buffer size of the transmission buffer 225. As the threshold value increases, the data holding period in the transmission buffer 225 becomes longer, and thus it is possible to shorten the power-on period of the wireless wide area network communication unit 230. For example, in a case where the threshold value is set to "2" and two or more pieces of data are held in the transmission buffer 225, the process proceeds to S305, and the data held in the transmission buffer 225 is transmitted by the wireless wide area network communication unit 230. On the other hand, in a case where one piece of data is held in the transmission buffer 225, the data transmission process ends.

In addition, in a case where the number of transmission buffer storage data is less than the threshold (for example, the threshold value="2") in S304, data transmission process ends. Thereafter, the process returns, and the data held in the reception buffer 221 is additionally stored in the transmission buffer 225 in S301 of FIG. 8. In this case, new held data is held and added following the end (final bit) of data held in advance in the transmission buffer 225. In addition, the power state control unit 224 stores "2" as the number of transmission buffer storage data.

In a case where there is no data string held in the reception buffer 221 in S303, or in a case where the number of pieces of data held in the transmission buffer 225 is equal to or greater than the threshold in S304, the wireless wide area network communication unit 230 transmits the data held in the transmission buffer 225 to the server 300 (S305). At this time, in a case where a plurality of pieces of held data are stored in the transmission buffer 225, the wireless wide area network communication unit 230 collectively transmits the plurality of pieces of data to the server 300.

Since the transmission buffer 225 becomes empty after the wireless wide area network communication unit 230 transmits data, the power state control unit 224 resets the number of transmission buffer storage data to "zero" (S306).

Thereafter, as in the first embodiment, the operation of the power-off timer is started (205), and when the power-off timer times out (S206), the data transmission process ends.

The data transmitted from the gateway 200A with a plurality of pieces of data collected is received in the server 300. Here, on the server 300 side, it is possible to analyze information such as the size of the data and a boundary between the data and the data with respect to the received data, and to decompose it into individual data. For example, in a case where the size of the entire received data is indicated and the size of the data is indicated at the beginning of individual data, there is a method of cutting out one piece of data on the basis of the data size, obtaining the data size from the beginning of the remaining data, and cutting out one piece of data on the basis of the data size, repeatedly, until the entire data size is reached.

Figure 9:
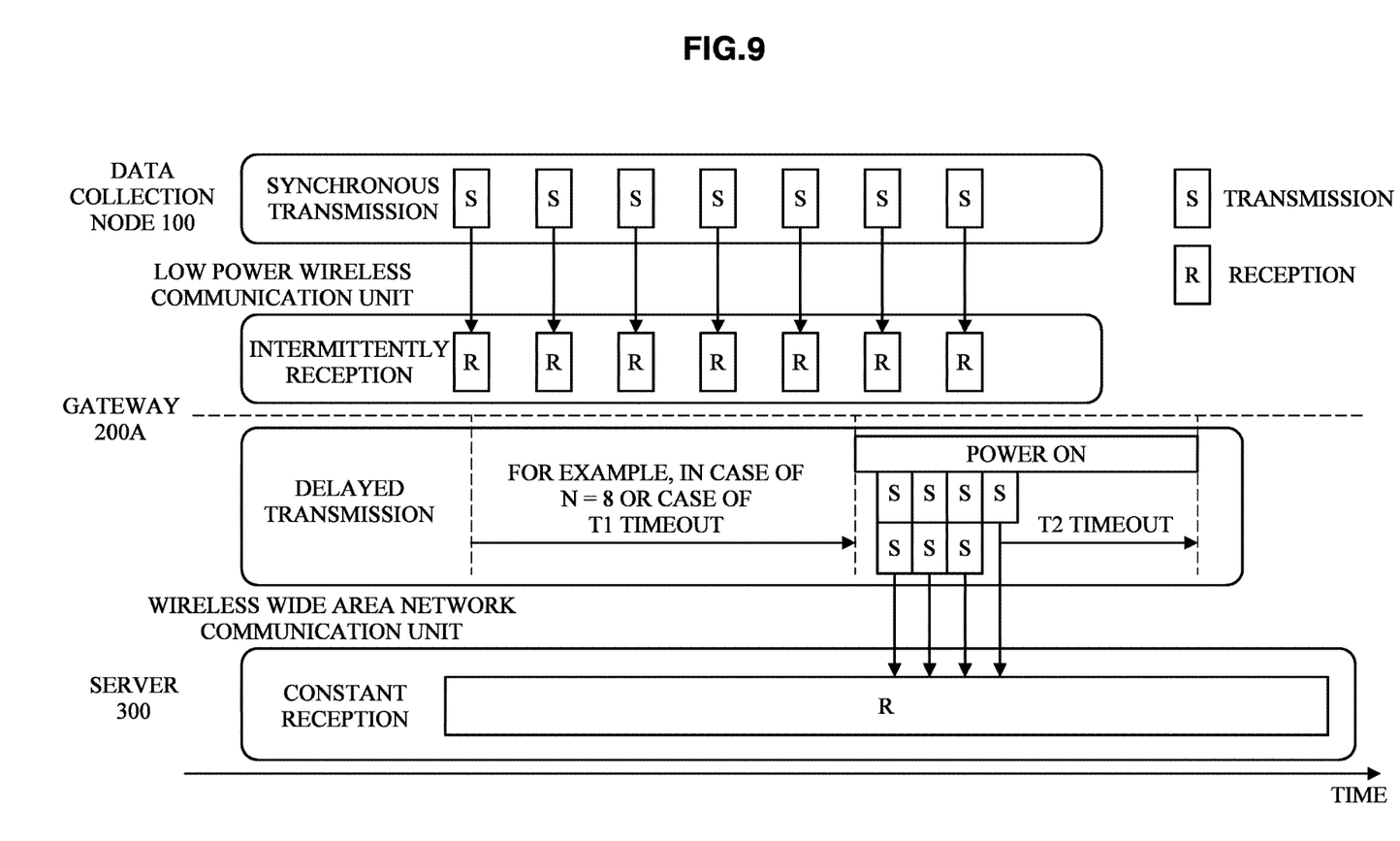
FIG. 9 is an explanatory diagram illustrating an operation of data communication to which a data collection system according to the second embodiment is applied.

FIG. 9 is an explanatory diagram illustrating an operation of data communication to which the data collection system according to the second embodiment is applied.

As illustrated in FIG. 9, similarly in the second embodiment, even when data is received from the data collection node 100, the gateway 200A holds the data without immediately transmitting it. After a certain amount of held data has been accumulated or a predetermined period has elapsed, the wireless wide area network communication unit 230 is supplied with electrical power and is powered on, and transmission of the data to the server 300 is started.

Here, in the second embodiment, in a case where the data held in the reception buffer 221 is copied and stored in the transmission buffer 225, and the number of transmission buffer storage data is equal to or greater than the threshold, the wireless wide area network communication unit 230 collectively transmits the plurality of pieces of data held in the transmission buffer 225. In the example of FIG. 9, the threshold value of the number of transmission buffer storage data is set to "2," and the wireless wide area network communication unit 230 can transmit two pieces of data at once in one transmission process.

Therefore, compared with FIG. 6 of the first embodiment, a plurality of pieces of data are collectively sent, and thus it is possible to complete the transmission of the same amount of data in a shorter time, and to further shorten the power-on time of the wireless wide area network communication unit 230, thereby allowing communication between the gateway 200A and the server 300 to be performed with further power saving.

Meanwhile, FIG. 9 illustrates a case where the threshold value of the number of transmission buffer storage data is set to "2," but the threshold value can also be set to be equal to or greater than "3" in accordance with the size of a transmission buffer that can be secured in the gateway 200A. In a case where there is a larger number of pieces of data, the power-on time of the wireless wide area network communication unit 230 can be shortened more than in a case where the threshold value is "2."

(B-3) Effect of Second Embodiment

As described above, according to the second embodiment, a plurality of pieces of data are collectively sent in accordance with the threshold of the number of transmission buffer storage data in addition to the effect described in the first embodiment, and thus it is possible to complete the transmission of the same amount of data in a shorter time, and to further shorten the power-on time of the wireless wide area network communication unit 230, thereby allowing communication between the gateway 200A and the server 300 to be performed with further power saving.

(C) Other Embodiments

Although various modification embodiments have been mentioned in the first and second embodiments described above, the present invention can also be applied to the following modification embodiments.

(C-1) In the operation of the second embodiment described above, although a case where the processing of FIG. 3 of the first embodiment is performed has been illustrated, the following modification example can be applied.

In the second embodiment, the value of the timer period T1 of the data holding timer, the value of the threshold N of the number of pieces of data held in the reception buffer 221, and the value of the timer period T2 of the power-off timer may each be set to "zero."

For example, the value of the timer period T1 of the data holding timer in S106 of FIG. 3 may be set to "zero," and/or the value of the threshold N of the number of pieces of data held in the reception buffer 221 in S107 of FIG. 3 may be set to "zero," and data transmission may be started immediately after the reception of data from the data collection node 100. Further, the value of the timer period T2 of the power-off timer in S205 of FIG. 8 may be set to "zero," and the wireless wide area network communication unit 230 may be powered off immediately after the wireless wide area network communication unit 230 transmits data. In this case, the processes of S201 and S202 of FIG. 8 may be omitted.

In a case where the gateway 200A receives a large amount of data from the data collection node 100 in a short period of time, the transmission of all data can be completed in a short time through the operation of once transmitting a plurality of pieces of data shown in the second embodiment, and the effect of power saving can be expected.

Further, even in a case where the frequency of transmission of data from a single data collection node 100 is not high, a large amount of data may be received in a short period of time when a plurality of data collection nodes 100 are connected to the gateway 200A, and the same effect is obtained.

(C-2) In the first and second embodiments, the communication control unit 220 or 220A may change the value of the timer period T1 of the data holding timer and/or the value of the threshold N of the number of pieces of data held in the reception buffer 221 on the basis of the data value received from the data collection node 100 and information indicating the determination result of the abnormal value or normal value of the data value (hereinafter also referred to as a "state determination flag").

For example, it is assumed that the data collection node 100 transmits sensor data to the server 300. In a case where an abnormality occurs in a sensing target and the value of the sensor data becomes a value (abnormal value) exceeding a range that can be taken in a normal state, the gateway 200 or 200A can be requested to immediately transmit data to the server 300.

In such a case, in a normal time, the value of the timer period T1 of the data holding timer and/or the value of the threshold N of the number of pieces of data held in the reception buffer 221 are set to non-zero values. In this case, as illustrated in the first or second embodiment, the wireless wide area network communication unit 230 can transmit data through delayed transmission, and power saving can be achieved.

On the other hand, in an abnormal time, the communication control unit 220 or 220A changes the value of the timer period T1 of the data holding timer and/or the value of the threshold N of the number of pieces of data held in the reception buffer 221 to "zero." This makes it possible for the wireless wide area network communication unit 230 to immediately transmit the data received from the data collection node 100.

Here, various methods can be used to determine whether the value of sensor data is an abnormal value or a normal value.

For example, the gateway 200 or 200A may read the value of sensor data from the data collection node 100 and make a direct determination. In this case, for example, information relating to a range that can be taken in a normal state may be stored in advance in the gateway 200 or 200A, and the communication control unit 220 or 220A may compare this information with the data value received this time and make a determination. Alternatively, for example, the communication control unit 220 or 220A may accumulate data values which are received intermittently, perform statistical processing using history information of the past data values, and use the statistical result to determine that the data value received this time exceeds the range of values in a normal state.

The communication control unit 220 or 220A can know that the value of sensor data is a normal value or an abnormal value on the basis of the state determination flag, and may change the value of the timer period T1 of the data holding timer and/or the value of the threshold N of the number of pieces of data held in the reception buffer 221 to "zero" when the value is an abnormal value.

In addition, for example, the data collection node 100 may determine the value of sensor data and determine it as an abnormal value. In this case, the data collection node 100 can also apply an abnormality determination method equivalent to the above-described example. The data collection node 100 transmits a state determination flag indicating a determination result of whether the data value is normal or abnormal, together with the value of sensor data, to the gateway 200 or 200A.

The gateway 200 or 200A having received this can know that the value of sensor data is a normal value or an abnormal value on the basis of the state determination flag, and the communication control unit 220 or 220A may change the value of the timer period T1 of the data holding timer and/or the value of the threshold N of the number of pieces of data held in the reception buffer 221 to "zero" when the value is an abnormal value.

REFERENCE SIGNS LIST 1 data collection system (communication system)
200 and 200A gateway
210 low power wireless communication unit
220 and 220A communication control unit
230 wireless wide area network communication unit
240 solar cell
250 power control unit
260 rechargeable battery
221 reception buffer
222 data holding timer management unit
223 power-off timer management unit
224 power state control unit
225 transmission buffer
100 data collection node
300 server

The invention claimed is:
1. A communication device configured to receive supply of electrical power from a battery unit and transmit and receive a data signal, the device comprising:
a processor; and a non-transitory storage medium containing program instructions, execution of which by the processor causes the communication device to provide functions of:
   a first wireless communication means configured to intermittently receive a data signal,
   a second wireless communication means configured to transmit a data signal, and
   a communication control means configured to temporarily hold the data signal received by the first wireless communication means, power off the second wireless communication means until a predetermined condition is satisfied, power on the second wireless communication means after a predetermined condition is satisfied, and transmit the held data signal, wherein
   the communication control means is configured to include
      a received data holding unit configured to hold the data signal received by the first wireless communication means, and
      a power state control unit configured to power on the second wireless communication means that has been powered off when the number of pieces of data held in the data signal in the received data holding unit is equal to or greater than a first threshold or when a data holding time of the data signal in the received data holding unit reaches a predetermined first time, and
   the communication control means is configured to change the first threshold and/or the value of the first time on the basis of a flag indicating whether the data signal needs to be transmitted immediately or not.

2. The communication device according to claim 1, wherein, when the data signal held in the received data holding unit is transmitted by the second wireless communication means and the number of pieces of data held in the received data holding unit runs out, the power state control unit powers off the second wireless communication means after a predetermined second time elapses.

3. The communication device according to claim 1, wherein the communication control means includes a transmission data holding unit, and
   the power state control unit causes the transmission data holding unit to sequentially hold copies of the data signal in the received data holding unit after the second wireless communication means is powered on, and causes the second wireless communication means to transmit a data signal obtained by connecting a plurality of data signals in the transmission data holding unit when the number of pieces of data held in the received data holding unit runs out or when the number of pieces of data held in the transmission data holding unit is equal to or greater than a second threshold.

4. The communication device according to claim 1, wherein the communication control means varies the first threshold related to the number of pieces of data held in the received data holding unit and/or a value of the first time related to the data holding time of the received data holding unit on the basis of the received data signal and state determination information for determining a value of the data signal.

5. The communication device according to claim 1, wherein the flag
   indicates that the data signal should be sent immediately if the data signal is abnormal, and
   indicates that the data signal should not be sent immediately if the data signal is normal.

6. A non-transitory storage medium that contains a communication program for a communication device configured to receive supply of electrical power from a battery unit and transmit and receive a data signal, the communication program comprising program instructions that are executable by a processor to cause the communication device to function as:
   a first wireless communication means configured to intermittently receive a data signal;
   a second wireless communication means configured to transmit a data signal; and
   a communication control means configured to temporarily hold the data signal received by the first wireless communication means, power off the second wireless communication means until a predetermined condition is satisfied, power on the second wireless communication means after a predetermined condition is satisfied, and transmit the held data signal, wherein
   the communication control means includes
      a received data holding unit configured to hold the data signal received by the first wireless communication means, and
      a power state control unit configured to power on the second wireless communication means that has been powered off when the number of pieces of data held in the data signal in the received data holding unit is equal to or greater than a first threshold or when a data holding time of the data signal in the received data holding unit reaches a predetermined first time; and
   the communication control means is configured to change the value of the first threshold and/or the value of the first time on the basis of a flag indicating whether the data signal needs to be transmitted immediately or not.

7. A communication method of receiving supply of electrical power from a battery unit and transmitting and receiving a data signal, the method comprising causing:
   a first wireless communication means to intermittently receive a data signal;
   a second wireless communication means to transmit a data signal under power control;
   a communication control means to temporarily hold the data signal received by the first wireless communication means, power off the second wireless communication means until a predetermined condition is satisfied, power on the second wireless communication means after a predetermined condition is satisfied, and transmit the held data signal, wherein
   the communication control means includes
      a received data holding unit configured to hold the data signal received by the first wireless communication means, and
      a power state control unit configured to power on the second wireless communication means that has been powered off when the number of pieces of data held in the data signal in the received data holding unit is equal to or greater than a first threshold or when a data holding time of the data signal in the received data holding unit reaches a predetermined first time; and
   the communication control means changes the value of the first threshold and/or the value of the first time on the basis of a flag indicating whether the data signal needs to be transmitted immediately or not.

\* \* \* \* \*